(12) United States Patent
Pu et al.

(10) Patent No.: US 11,275,952 B2
(45) Date of Patent: Mar. 15, 2022

(54) MONITORING METHOD, APPARATUS AND SYSTEM, ELECTRONIC DEVICE, AND COMPUTER READABLE STORAGE MEDIUM

(71) Applicant: HANGZHOU HIKVISION DIGITAL TECHNOLOGY CO., LTD., Hangzhou (CN)

(72) Inventors: Shiliang Pu, Hangzhou (CN); Xinxin Nie, Hangzhou (CN); Meng Fan, Hangzhou (CN); Hai Yu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 82 days.

(21) Appl. No.: 16/647,348

(22) PCT Filed: Aug. 22, 2018

(86) PCT No.: PCT/CN2018/101671
§ 371 (c)(1),
(2) Date: Mar. 13, 2020

(87) PCT Pub. No.: WO2019/052320
PCT Pub. Date: Mar. 21, 2019

(65) Prior Publication Data
US 2021/0034881 A1 Feb. 4, 2021

(30) Foreign Application Priority Data
Sep. 15, 2017 (CN) .......................... 201710834952.7

(51) Int. Cl.
*G06K 9/00* (2006.01)
*G06T 7/37* (2017.01)
(Continued)

(52) U.S. Cl.
CPC ....... *G06K 9/00771* (2013.01); *G06K 9/6267* (2013.01); *G06T 7/37* (2017.01); *G06T 7/70* (2017.01); *G06K 2209/21* (2013.01)

(58) Field of Classification Search
CPC ............. G06K 9/00771; G06K 9/6267; G06K 2209/21; G06T 7/37; G06T 7/70
See application file for complete search history.

(56) References Cited

U.S. PATENT DOCUMENTS 6,496,594 B1 * 12/2002 Prokoski .............. A61B 5/1176
382/118
6,775,404 B1 * 8/2004 Pagoulatos ............... G06T 3/00
128/916
(Continued)

FOREIGN PATENT DOCUMENTS

CN 101383004 3/2009
CN 102231205 11/2011
(Continued)

OTHER PUBLICATIONS

Office Action issued in Corresponding Chinese Application No. 201710834952.7, dated Apr. 22, 2020 (English Translation Provided).
(Continued)

*Primary Examiner* — Manav Seth
(74) *Attorney, Agent, or Firm* — Norton Rose Fulbright US LLP

(57) ABSTRACT

A surveillance method, apparatus, system, electronic device and computer-readable storage medium are provided. In the surveillance method, a non-visible light image and a target image are obtained, wherein the target image is generated from a visible light signal captured during a capture period of the non-visible light image. The method then detects whether an object is present in the non-visible light image. When an object is detected in the non-visible light image, a
(Continued)

second location area of the object in a visible light image is determined according to a first location area of the object in the non-visible light image, such that surveillance of the object is implemented based on the visible light image, wherein the visible light image is an image determined based on the target image.

16 Claims, 4 Drawing Sheets

(51) Int. Cl.
  *G06T 7/70* (2017.01)
  *G06K 9/62* (2022.01)

(56) References Cited

U.S. PATENT DOCUMENTS

| | | | | |
|---|---|---|---|---|
| 7,602,942 | B2* | 10/2009 | Bazakos | G06K 9/00255 |
| | | | | 209/577 |
| 7,994,480 | B2* | 8/2011 | Johnson | G01C 3/08 |
| | | | | 250/370.08 |
| 8,093,559 | B1* | 1/2012 | Rajavel | H01L 27/14694 |
| | | | | 250/330 |
| 8,463,006 | B2* | 6/2013 | Prokoski | G06T 7/0012 |
| | | | | 382/128 |
| 8,466,422 | B2* | 6/2013 | Johnson | G01J 5/0265 |
| | | | | 250/370.08 |
| 8,531,562 | B2* | 9/2013 | Schmidt | H04N 5/23212 |
| | | | | 348/262 |
| 9,549,101 | B1* | 1/2017 | Brain | H04N 7/18 |
| 9,785,247 | B1* | 10/2017 | Horowitz | G06T 7/20 |
| 9,983,686 | B2* | 5/2018 | Horowitz | G06F 3/011 |
| 9,986,176 | B2* | 5/2018 | Moghadam | H04N 13/25 |
| 9,996,913 | B2* | 6/2018 | Beck | G06T 5/001 |
| 10,262,230 | B1* | 4/2019 | Yan | G06K 9/3241 |
| 10,719,728 | B2* | 7/2020 | Zhang | G06K 9/00892 |
| 11,049,232 | B2* | 6/2021 | Fan | H04N 9/04553 |
| 2005/0074221 | A1 | 4/2005 | Remillard et al. | |
| 2010/0172567 | A1* | 7/2010 | Prokoski | A61B 5/418 |
| | | | | 382/132 |
| 2010/0189313 | A1* | 7/2010 | Prokoski | G01K 13/20 |
| | | | | 382/118 |
| 2010/0191541 | A1* | 7/2010 | Prokoski | A61B 5/418 |
| | | | | 705/2 |
| 2013/0226452 | A1* | 8/2013 | Watts | G01C 21/3407 |
| | | | | 701/528 |
| 2015/0324656 | A1 | 11/2015 | Marks et al. | |
| 2018/0240251 | A1 | 8/2018 | Kitagawa | |
| 2018/0338092 | A1 | 11/2018 | Fan et al. | |
| 2021/0034901 | A1* | 2/2021 | Chen | G06K 9/2018 |

FOREIGN PATENT DOCUMENTS

| | | |
|---|---|---|
| CN | 102542569 | 7/2012 |
| CN | 102567707 | 7/2012 |
| CN | 102789114 | 11/2012 |
| CN | 103745203 | 4/2014 |
| CN | 105203159 | 12/2015 |
| CN | 105913040 | 8/2016 |
| CN | 106056594 | 10/2016 |
| CN | 106446873 | 2/2017 |
| CN | 106454049 | 2/2017 |
| CN | 106485245 | 3/2017 |
| CN | 106488201 | 3/2017 |
| WO | WO 2009/128065 | 10/2009 |
| WO | WO 2017/036270 | 3/2017 |
| WO | WO 2017/073344 | 5/2017 |

OTHER PUBLICATIONS

Extended European Search Report issued in Corresponding European Application No. 18855830.8, dated Oct. 9, 2020.
International Search Report and Written Opinion issued in corresponding PCT application No. PCT/CN2018/101671, dated Oct. 31, 2018 (English translation of International Search Report provided).
Office Action issued in Corresponding Chinese Application No. 201710834952.7, dated Oct. 28, 2021.

* cited by examiner

MONITORING METHOD, APPARATUS AND SYSTEM, ELECTRONIC DEVICE, AND COMPUTER READABLE STORAGE MEDIUM

CROSS-REFERENCE TO RELATED APPLICATIONS

The present application is a national phase application under 35 U.S.C. § 371 of International Application No. PCT/CN2018/101671, filed Aug. 22, 2018, which claims the priority to a Chinese patent application No. 201710834952.7 filed with the China National Intellectual Property Administration on Sep. 15, 2017. The contents of the above-referenced applications are incorporated herein by reference in their entirety.

TECHNICAL FIELD

The present application relates to the field of surveillance technology, and in particular, to a surveillance method, apparatus, system, electronic device, and computer-readable storage medium.

BACKGROUND

As issues, such as urban transportation public safety and preventions in important regions, are drawing heightened concerns, video surveillance is becoming more and more widely used. Intelligent surveillance technologies have emerged with the rapid development of science and technology. An intelligent surveillance device can automatically detect a preset object, such as a human or a vehicle, from a captured image, and determine the location area of the object in the captured image. For example, if the preset object is set to a human, the intelligent surveillance device will automatically detect the location area of a person in the captured image when the image is captured.

In the relevant art, for intelligent surveillance, the intelligent surveillance device captures a visible light image, and then performs object detection on the visible light image using an object detection technique to determine the location area of the object in the captured image. However, in the case of low illumination, the visible light image captured by the intelligent surveillance device usually has a poor image quality. In this case, the object detection performed on the visible light image using the object detection technique may not produce an accurate object detection result, which results in inaccurate estimation of the location area where the object is located in the visible light image, and thereby results in a poor surveillance effect.

SUMMARY

The objective of the embodiments of the present application is to provide a surveillance method, apparatus, system, electronic device, and computer-readable storage medium to improve the accuracy of determination of the location area of an object in a visible light image and guarantee the effect of surveillance. Specific technical solutions are now described below.

To achieve the above objective, in a first aspect, an embodiment of the present application provides a surveillance method. The method includes: obtaining a non-visible light image and a target image, wherein the target image is generated from a visible light signal captured during a capture period of the non-visible light image; detecting an object in the non-visible light image; and when an object is detected in the non-visible light image, determining a second location area of the object in a visible light image according to a first location area of the object in the non-visible light image, such that surveillance of the object is implemented based on the visible light image, wherein the visible light image is an image determined based on the target image.

Optionally, the visible light image is the target image. the step of determining the second location area of the object in the visible light image according to the first location area of the object in the non-visible light image includes: performing location registration on the first location area of the object in the non-visible light image taking the visible light image as a reference to obtain a first location area that has subjected to the registration, and determining a location area in the visible light image corresponding to the first location area that has subjected to the registration as the second location area of the object in the visible light image.

Optionally, the step of performing the location registration on the first location area of the object in the non-visible light image taking the visible light image as the reference to obtain the first location area that has subjected to the registration includes: performing the location registration on the first location area of the object in the non-visible light image according to the following formula taking the visible light image as the reference to obtain the first location area that has subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

Optionally, the visible light image is an image resulting from location registration applied to the target image taking the non-visible light image as a reference; and wherein the step of determining the second location area of the object in the visible light image according to the first location area of the object in the non-visible light image includes: determining a location area in the visible light image, which is the same as the first location area of the object in the non-visible light image, as the second location area of the object in the visible light image.

Optionally, after the step of determining the second location area of the object in the visible light image according to the first location area of the object in the non-visible light image, the method further includes: marking the object at the second location area on the visible light image.

Optionally, after the step of marking the object at the second location area on the visible light image, the method further includes: marking a class of the object on the visible light image with respect to the determined second location area of the object.

Optionally, when an object is detected in the non-visible light image, the method further includes: identifying attribute information of the object in the non-visible light image to obtain an identification result; and wherein after the step of marking the object at the second location area on the visible light image, the method further includes: marking the identification result for the object on the visible light image with respect to the second location area.

Optionally, after the step of obtaining the non-visible light image and the target image, the method further includes: determining a fill light status parameter based on the non-visible light image; and providing non-visible light depending on the fill light status parameter.

In a second aspect, an embodiment of the present application provides a surveillance apparatus. The apparatus includes: an obtaining module, configured to obtain a non-visible light image and a target image, wherein the target image is generated from a visible light signal captured during a capture period of the non-visible light image; a detecting module, configured to detect an object in the non-visible light image; and a first determining module, configured to determine, when an object is detected in the non-visible light image by the detecting module, a second location area of the object in a visible light image according to a first location area of the object in the non-visible light image, such that surveillance of the object is implemented based on the visible light image, wherein the visible light image is an image determined based on the target image.

Optionally, the visible light image is the target image; and wherein the first determining module is further configured to perform location registration on the first location area of the object in the non-visible light image taking the visible light image as a reference to obtain a first location area that has subjected to the registration, and determine a location area in the visible light image corresponding to the first location area that has subjected to the registration as the second location area of the object in the visible light image.

Optionally, the first determining module is further configured to: perform the location registration on the first location area of the object in the non-visible light image according to the following formula taking the visible light image as the reference to obtain the first location area that has subjected to the registration, and determine a location area in the visible light image corresponding to the first location area that has subjected to the registration as the second location area of the object in the visible light image:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

Optionally, the visible light image is an image resulting from location registration applied to the target image taking the non-visible light image as a reference; and wherein the first determining module is further configured to determine a location area in the visible light image, which is the same as the first location area of the object in the non-visible light image, as the second location area of the object in the visible light image.

Optionally, the apparatus further includes: a marking module, configured to mark the object at the second location area on the visible light image after the second location area of the object in the visible light image is determined.

Optionally, the marking module is further configured to mark a class of the object on the visible light image with respect to the determined second location area of the object after marking the object at the second location area on the visible light image.

Optionally, the apparatus further includes: an identifying module, configured to identify, when an object is detected in the non-visible light image, attribute information of the object in the non-visible light image to obtain an identification result. Accordingly, the marking module is further configured to mark the identification result for the object on the visible light image with respect to the second location area after marking the object at the second location area on the visible light image.

Optionally, the apparatus further includes: a second determining module, configured to determine a fill light status parameter based on the non-visible light image after the non-visible light image and the target image are obtained; and a light filling module, configured to provide non-visible light depending on the fill light status parameter.

In a third aspect, an embodiment of the present application provides a surveillance system. The system includes a target image capturing device, a non-visible light image capturing device, and an image processing device. The non-visible light image capturing device is configured to capture a non-visible light image and transmit the captured non-visible light image to the image processing device. The target image capturing device is configured to generate a target image from a visible light signal captured during a capture period of the non-visible light image, and transmit the target image to the image processing device. The image processing device is configured to receive the target image from the target image capturing device and the non-visible light image from the non-visible light image capturing device; detect an object in the non-visible light image; and when an object is detected in the non-visible light image, determine a second location area of the object in a visible light image according to a first location area of the object in the non-visible light image, such that surveillance of the object is implemented based on the visible light image, wherein the visible light image is an image determined based on the target image.

Optionally, the visible light image is the target image. The image processing device determines the second location area of the object in the visible light image according to the first location area of the object in the non-visible light image by: performing location registration on the first location area of the object in the non-visible light image taking the visible light image as a reference to obtain a first location area that has subjected to the registration, and determining a location area in the visible light image corresponding to the first location area that has subjected to the registration as the second location area of the object in the visible light image.

Optionally, the image processing device performs the location registration on the first location area of the object in the non-visible light image taking the visible light image as the reference to obtain the first location area that has subjected to the registration by: performing the location registration on the first location area of the object in the non-visible light image according to the following formula taking the visible light image as the reference to obtain the first location area that has subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through $a_{31}$ $a_{32}$ $a_{33}$ offline calibration.

Optionally, the visible light image is an image resulting from location registration applied to the target image taking the non-visible light image as a reference; and wherein the image processing device determines the second location area of the object in the visible light image according to the first location area of the object in the non-visible light image by: determining a location area in the visible light image, which is the same as the first location area of the object in the non-visible light image, as the second location area of the object in the visible light image.

Optionally, the image processing device is further configured to mark the object at the second location area on the visible light image.

Optionally, the image processing device is further configured to mark a class of the object on the visible light image with respect to the determined second location area of the object.

Optionally, the image processing device is further configured to, when an object is detected in the non-visible light image, identify attribute information of the object in the non-visible light image to obtain an identification result; and mark the identification result for the object on the visible light image with respect to the second location area after marking the object at the second location area on the visible light image.

Optionally, the system further includes a fill light lamp for providing non-visible light. The non-visible light image capturing device is further configured to determine a fill light status parameter according to the non-visible light image after the non-visible light image is obtained. The fill light lamp for providing non-visible light provides non-visible light depending on the fill light status parameter.

In a fourth aspect, an embodiment of the present application provides an electronic device, which includes a processor, a communication interface, a memory, and a communication bus. The processor, the communication interface, and the memory communicate with each other via the communication bus. The memory is configured to store a computer program. The processor is configured to carry out the steps of any of the surveillance methods described above by executing the program stored in the memory.

In a fifth aspect, an embodiment of the present application provides a computer-readable storage medium having stored thereon a computer program which, when executed on a computer, causes the computer to carry out the steps of any of the surveillance methods described above.

In a sixth aspect, an embodiment of the present application provides a computer program product which, when executed on a computer, causes the computer to carry out the steps of any of the surveillance method described above.

In the solutions provided by the embodiments of the present application, a non-visible light image and a target image are obtained, wherein the target image is generated from a visible light signal captured during a capture period of the non-visible light image. Then, it is detected whether an object is present in the non-visible light image. When an object is detected in the non-visible light image, a second location area of the object in a visible light image is determined according to a first location area of the object in the non-visible light image, such that surveillance of the object is implemented based on the visible light image. The visible light image is an image determined based on the target image.

Compared with the relevant art, the embodiments proposes to use the result of the object detection performed on the non-visible light image to determine the result of the object detection performed for the visible light image corresponding to the non-visible light image. An invisible light signal is less affected by the luminance in the ambient than a visible light signal. In the case of low illumination, as the non-visible light image has a high image quality, a detection result with high accuracy can be obtained from the object detection on the non-visible light image, which guarantees that the object detection result of the target image determined based on the visible light image also has a high accuracy and thereby guarantees and improves the effect of intelligent surveillance.

BRIEF DESCRIPTION OF THE DRAWINGS

In order to explain the technical solutions of the embodiments of the present application or the prior art more clearly, a brief description of the drawings used in the embodiments or the prior art will be given below. It is apparent that the drawings described below are merely for some embodiments of the present application. Those of ordinary skills in the art may obtain other drawings based on the drawings herein without any creative effort.

DETAILED DESCRIPTION

In the following detailed description, specific embodiments are set forth in connection with the drawings to provide a clear and thorough understanding of the technical solutions in the embodiments of the present application. Obviously, the described embodiments below are only some of the embodiments of the present application, but not all of them. Based on the embodiments herein, any other embodiments obtained by a human of ordinary skill in the art without any creative effort shall fall within the protection scope of the present application.

The terminologies used herein are briefly described below.

The term "visible light image" means an image generated from visible light signals through imaging. Similarly, the term "non-visible light image" means an image generated from non-visible light signals. The non-visible light is electromagnetic waves that cannot be perceived by human eyes, including infrared light and ultraviolet light. The infrared light usually refers to near infrared light (NIR), which is an electromagnetic wave with the wavelength between those of visible light (VIS) and those of mid-infrared light (MIR). According to the definition from ASTM (American Society for Testing and Materials Testing), NIR refers to electromagnetic waves covering the wavelengths ranging from 780 to 2526 nm. The near-infrared region is usually divided into near-infrared short-wave (780 to 1100 nm) region and near-infrared long wave (1100 to 2526 nm) region.

In the present application, the non-visible light may refer to infrared light, and the non-visible light image may accordingly refer to an infrared image. The non-visible light may also be near-infrared light, and the non-visible light image may be a near-infrared image accordingly.

The term "object detection" refers to the detection of a preset object (such as humans or vehicles) in images using an object detection method. The object detection can determine the location of the object in the image and the class of the object. Methods for object detection generally include deep learning-based approaches, image segmentation-based approaches, and feature matching-based approaches.

Details of specific embodiments will be described below by way of examples.

A surveillance method provided by an embodiment of the present application is applicable to surveillance devices capable of capturing visible light images and non-visible light images, which may include, but not limited to, such as spherical cameras (dome cameras), or is applicable to image processing devices for processing images from cameras.

Figure 1:
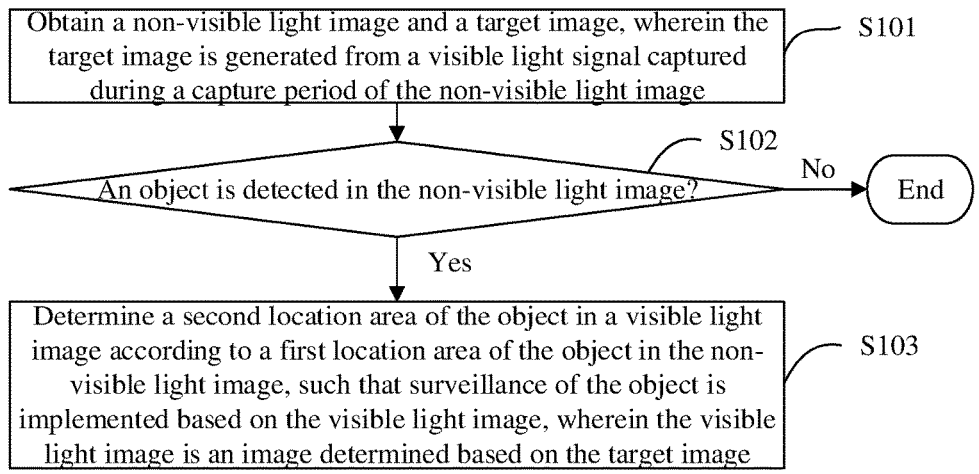
FIG. 1 is a schematic flowchart of a surveillance method provided by an embodiment of the present application.

As shown in FIG. 1, a surveillance method provided by an embodiment of the present application includes, step S101, obtaining a non-visible light image and a target image, wherein the target image is generated from a visible light signal captured during the capture period of the non-visible light image.

It should be noted that the target image obtained at step S101 is generated, through imaging, from a visible light signal(s) captured during the capture period of the non-visible light signal(s), and there is a one-to-one correspondence between the non-visible light image and the target image. The non-visible light image and the target image may be images acquired with respect to a same scene. Further, the non-visible light image and the target image are acquired with respect to a same scene and in a same exposure.

In an optional implementation of obtaining the target image and the non-visible light image, the step S101 may include receiving the target image and the non-visible light image transmitted by other device such as a camera. The target image and the non-visible light image are thus obtained.

For example, the surveillance device may be an image processing device. The image processing device is communicatively connected to a camera. The camera can capture the non-visible light image and the corresponding target image simultaneously, and send the captured non-visible light image and target image to the image processing device. The image processing device receives the non-visible light image and the target image.

In another optional implementation of obtaining the target image and the non-visible light image, the surveillance device may be a device with camera functionality. The surveillance device is provided with an imaging component. The imaging component captures a non-visible light signal(s) and a visible light signal(s), and generates the non-visible light image from the captured non-visible light signal(s) and the target image from the captured visible light signal(s).

In one case, the imaging component includes a camera lens, a beam-splitting unit, a visible light sensor, and a non-visible light sensor. The beam-splitting unit may be a semi-reflective and semi-transparent mirror, which allows visible light to pass while reflects non-visible light. Specifically, the specific product form of the semi-reflective and semi-transparent mirror may be, but not limited to, a beam-splitting prism. Those skilled in the art will appreciate that the beam-splitting prism allows visible light to pass, but block or reflect non-visible light. In other words, the non-visible wavelength band of incident light is filtered out by the reflective surface of the prism (the non-visible light that is filtered out may be reflected), and the visible light is allowed to pass. In addition, the visible light band range that the beam-splitting prism allows to pass can vary depending on the thickness of the prism coating. The embodiment of the present application may use any relevant arts to adjust the thickness of the prism coating, which will not be limited herein.

In this case, the incident light captured by the camera lens is split into a visible light signal and a non-visible light signal by the beam-splitting unit. The visible light sensor converts the visible light signal to generate the target image. Similarly, the non-visible light sensor converts the non-visible light signal to generate the non-visible light image.

In another case, the imaging component includes two cameras. One of the cameras is adapted to capture a visible light signal(s), and generate the target image from the captured visible light signal(s). The other camera is adapted to capture a non-visible light signal(s), and generate the non-visible light image from the captured non-visible light signal(s).

Figure 2:
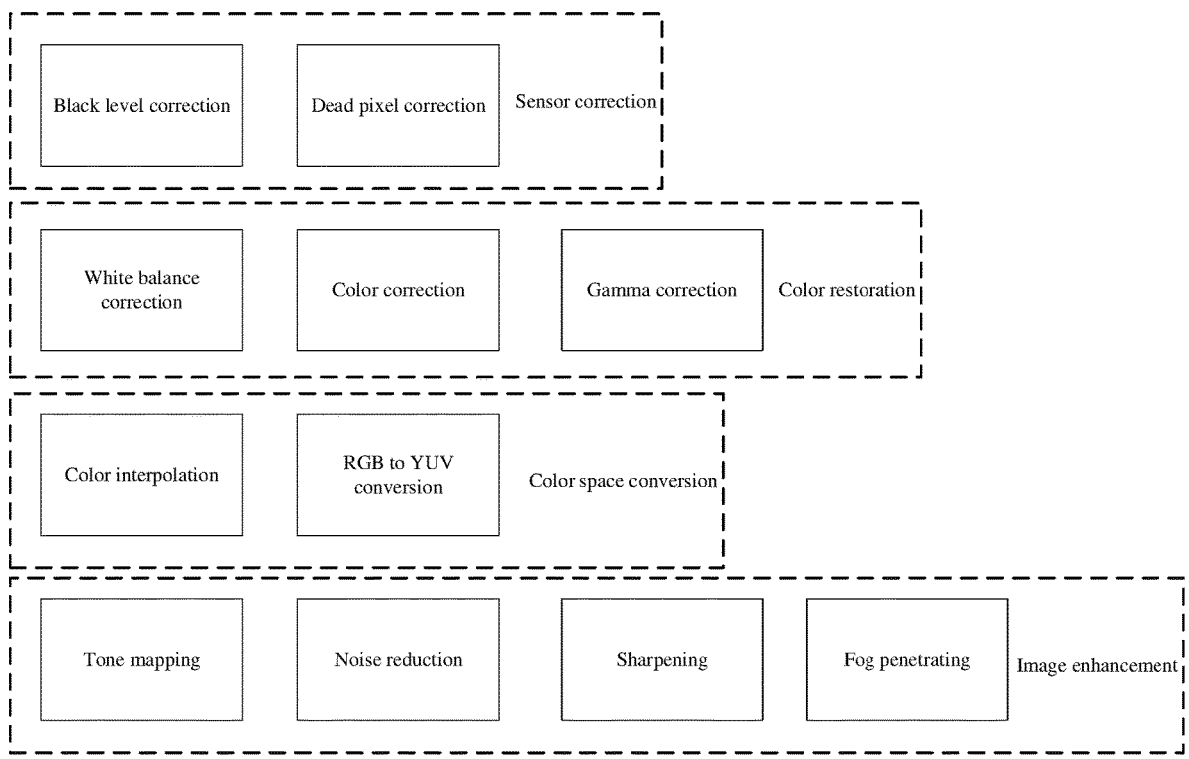
FIG. 2 is a schematic diagram showing an ISP (Image Signal Processing) performed on a target image involved in an embodiment of the present application.

In an embodiment of the present application, in order to guarantee the image quality of the target image, an ISP (Image Signal Processing) may be applied to the target image. In other words, the target image obtained at step S101 has subjected to the ISP. As shown in FIG. 2, the ISP applied to the original target image obtained by imaging may include: sensor correction including black level correction and dead pixel correction; color restoration processing including white balance correction, color correction and gamma correction; color space conversion processing including color interpolation and RGB (a color standard) to YUV (a color standard) conversion processing; and image enhancement processing including tone mapping, noise reduction, sharpening and fog penetrating. The processes included in the ISP may be performed on the original target image in any order, which is not limited herein.

Figure 3:
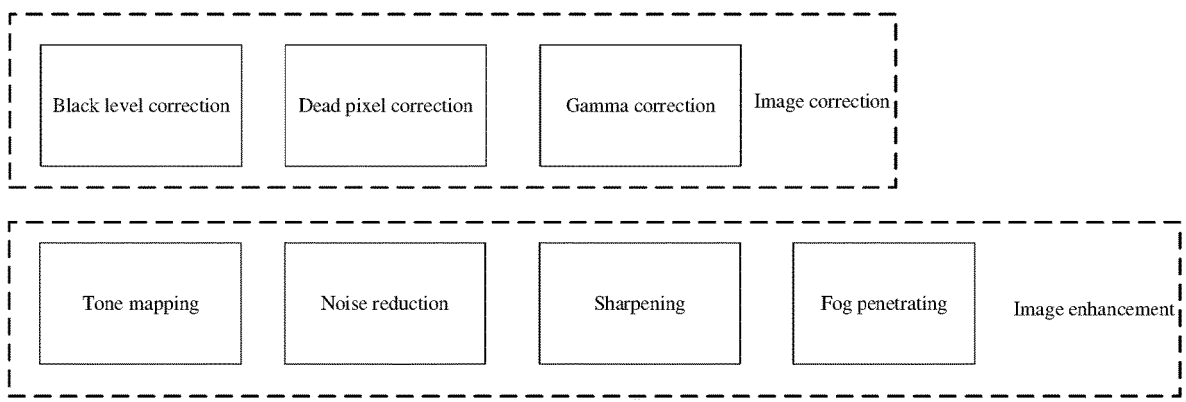
FIG. 3 is a schematic diagram showing an ISP performed on a non-visible light image involved in an embodiment of the present application.

Similarly, in order to guarantee the image quality of the non-visible light image, an ISP may be applied to the non-visible light image. In other words, the non-visible light image obtained at step S101 has subjected to the ISP. As shown in FIG. 3, the ISP applied to the original non-visible light image obtained by imaging may include: image correction processing including black level correction, dead pixel correction and gamma correction; and image enhancement processing including tone mapping, noise reduction, sharpening, and fog penetrating. The processes included in the ISP may be performed on the original non-visible light image in any order, which is not limited herein.

It should be noted that, the embodiment of the present application may use any ISP approach in the relevant art to process the original target image and non-visible light image, which will not be described in detail herein.

In an implementation, the surveillance device uses the captured visible light signal and non-visible light signal to generate the target image and the non-visible light image, respectively. In order to improve the signal-to-noise ratio of the non-visible light image, the non-visible light signal captured by the surveillance device may contain a non-visible light signal from ambient incident light and an additional non-visible light signal.

That means, in the embodiment of the present application, the surveillance device may further include a fill light lamp for providing non-visible light, and status parameters, such as the intensity of the light to be provided from the fill light lamp (referred to as fill light intensity), may be set as a fixed value in advance. In one case, in practice, the illumination intensity may change at any time. In order to guarantee sufficient non-visible light and achieve dynamic adjustment of the fill light status parameters, after step S101, the method may further include step a and step b. At step a, a fill light status parameter or parameters are determined based on the non-visible light image.

The surveillance device can determine the fill light status parameters according to the image information of the non-visible light image. The image information here may include signal-to-noise ratio and an exposure parameter of the non-visible light image. The fill light status parameters may include a parameter indicating whether the fill light lamp is turned on or off, and a parameter indicating the intensity of the fill light. Of course, the embodiment of the present application may use any relevant arts to implement step a, and the following examples are provided for illustration purpose.

In an example, after the non-visible light image is obtained, the surveillance device calculates the signal-to-noise ratio of the non-visible light image. When the calculated signal-to-noise ratio is greater than a threshold T1, the fill light intensity is determined to be 0, indicating the fill light lamp for providing non-visible light should be turned off. When the calculated signal-to-noise ratio is less than a threshold T2, a new fill light intensity is determined as the sum of the original fill light intensity and a preset positive value K1. When the calculated signal-to-noise ratio is in the range of [T1, T2], it is determined that the fill light intensity remains the same, that is, the new fill light intensity equals to the original fill light intensity, where T1>T2.

In an implementation, the original fill light intensity may refer to the fill light intensity of the fill light lamp for providing non-visible light when the non-visible light image is obtained.

At step b, non-visible light is provided according to the determined fill light status parameters.

The provision of the non-visible light according to the determined fill light status parameters herein means that the fill light lamp provides non-visible light according to the determined fill light status parameters, such that the non-visible light signal captured by the surveillance device thereafter contains both a non-visible light signal from the ambient incident light and an additional non-visible light signal provided by the fill light lamp. For example, the fill light lamp may be an LED fill light lamp for providing infrared light, and the fill light status parameter may be the number of LED lamp heads, intensity and angle of the provided infrared light. The LED fill light lamp provides infrared light according to the number of LED lamp heads, the intensity of the infrared fill light, and the angle of the infrared fill light.

It should be noted, providing additional non-visible light by the surveillance device according to the determined fill light status parameters will not affect the image quality of the currently obtained non-visible light image, but rather affect the image quality of non-visible light images subsequently obtained after the current instant.

At step S102, a detection as to whether an object presents in the non-visible light image is made.

It should be noted that the object here is a preset object to be detected. For example, if the class of the preset object is humans or vehicles, step S102 will detect whether a human or a vehicle is present in the non-visible light image. If the class of the preset object is humans, step S102 will detect whether a person is present in the non-visible light image.

In an embodiment of the present application, the surveillance device may use any relevant arts to perform step S102. For example, an object detection technique may be used to detect whether an object is present in the non-visible light image. The object detection technique here may include, but not limited to, a deep learning-based approach, an image segmentation-based approach, a feature matching-based approach, or the like. 6. Contents related to the object detection approaches are well known, and thus their detailed descriptions are omitted.

In an embodiment of the present application, if an object is detected in the non-visible light image at step S102, the method proceeds to step S103 to determine the location area of the object in the visible light image, referred to as a second location area, according to the location area of the object in the non-visible light image, referred to as a first location area. The surveillance of the object can thus be implemented based on the visible light image. The visible light image here is an image determined based on the target image.

Those skilled in the art can appreciate that in the process of object detection by using technologies such as object detection methods, when an object is detected in the non-visible light image, the location area of the object in the non-visible light image is thus determined at that time. In addition, after the second location area of the object in the visible light image is determined, the visible light image is thereby obtained by the surveillance device with the second location area determined. In this way, the object detection on the visible light image is completed, and surveillance of the object can be performed based on the visible light image.

In the embodiment of the present application, the non-visible light image and the target image are acquired with respect to the same scene and in the same exposure period. When an object is present in the non-visible light image, the object is present in the target image. The visible light image is an image determined according to the target image, and the visible light image contains object features of the target image. That means, when the object is present in the target image, the object is present in the visible light image.

In an implementation, the visible light image is an image determined based on the target image, and the visible light image contains object features of the target image. For example, when the target image contains a human, that is, the target image has features of the human, the visible light image contains the features of the human in the target image.

In an implementation, as shown in FIG. 1, when no object is detected at step S102, the process of the surveillance method comes to an "end", indicating that there is no object in the visible light image. At this point, the surveillance device obtains an image having no object, which image is generated based on the visible light signal captured during the capture period of the non-visible light image. On the contrary, when an object is detected at step S102, the surveillance device obtains a visible light image with a second location area therein determined.

The above visible light image is an image determined based on the target image. In one case, the visible light image is the target image. In an optional implementation of step S103, when the visible light image is the target image, the step of determining the second location area of the object in the visible light image according to the first location area of the object in the non-visible light image may include: determining a location area in the visible light image that is the same as the first location area of the non-visible light image, and determining the determined location area as the second location area of the object in the visible light image.

By way of an example, the first location area is identified in the non-visible light image as a rectangular region with pixels of coordinates from (x2, y2) to (x2+100, y2+200). In the visible light image, i.e., the target image, a rectangular region with pixels of the same coordinates from (x2, y2) to (x2+100, y2+200) is determined as the second location area.

In an implementation, due to design and/or manufacturing process of the device, there may be a position deviation between the target image and the non-visible light image. The position deviation between the target image and the non-visible light image may be eliminated to align the visible light image with the non-visible light image at pixel level and thus to guarantee the accuracy of the determined second location area. To this end, as another optional implementation of step S103, when the visible light image is the target image, the step of determining the second location area of the object in the visible light image according to the first location area of the object in the non-visible light image (S103) may include: performing location registration on the first location area of the object in the non-visible light image by taking the visible light image as a reference to obtain a first location area that has been subjected to the registration, and determining a location area in the visible light image corresponding to the first location area that has been subjected to the registration as the second location area of the object in the visible light image.

In an embodiment of the present application, the registration may be applied to the entire non-visible light image taking the visible light image as the reference. However, in order to reduce the amount computations, the location registration may be applied to only the first location area of the object in the non-visible light image. Of course, the registration may be implemented by relevant arts such as position registration based on horizontal mirroring, affine transformation, or projection transformation.

In an optional implementation, the step of performing the location registration on the first location area of the object in the non-visible light image by taking the visible light image as a reference to obtain the first location area that has been subjected to the registration may include: performing the location registration on the first location area of the object in the non-visible light image according to the following formula and taking the visible light image as the reference to obtain the first location area that has been subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

where (x, y) represents coordinates of a pixel in the first location area, (x1, y1) represents coordinates of a corresponding pixel in the first location area that has been subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

The affine transformation matrix can be obtained through offline calibration using affine transformation in the relevant art.

By way of an example, a first location area is identified in the non-visible light image as a rectangular region with pixels of coordinates from (x2, y2) to (x2+100, y2+200). The position registration is applied to the first location area by using the above formula, such that the first location area is transformed to a rectangular area with pixels of coordinates from (x2+2, y2+4) to (x2+102, y2+204) in the non-visible light image. Then, in the visible light image, the rectangular region with the same pixels of coordinates from (x2+2, y2+4) to (x2+102, y2+204) is determined as the second location area in the visible light image.

It should be emphasized that the above-mentioned examples of obtaining the first location area that has been subjected to the registration is only for illustration, and will not limit the embodiments of the present application. Those skilled in the art can obtain the first location area that has been subjected to the registration using the relevant arts.

In addition, in order to guarantee that the visible light image and the non-visible light image are aligned at pixel level to guarantee the accuracy of the determined second location area, the visible light image is an image determined based on the target image. Specifically, in another case, the visible light image may be an image obtained by performing location registration on the target image by taking the non-visible light image as a reference.

Of course, the location registration on the target image taking the non-visible light image as a reference can be performed in a similar way as the step of performing location registration on the first location area of the object in the non-visible light image by taking the visible light image as a reference. Those skilled in the art can apply the location registration to the target image taking the non-visible light image as a reference in a similar way of performing the location registration on the first location area of the object in the non-visible light image by taking the visible light image as a reference, which will be not described in detail herein.

In this case, the step of determining the second location area of the object in the visible light image according to the first location area of the object in the non-visible light image (S103) may include determining a location area in the visible light image, which is the same as the first location area of the object in the non-visible light image, as the second location area of the object in the visible light image.

By way of an example, the first location area is identified in the non-visible light image, for example, as a rectangular region with pixels of coordinates from (x2, y2) to (x2+200, y2+100). In the visible light image, i.e., the target image that has been subject to the registration, a rectangular region with pixels of coordinates from (x2, y2) to (x2+200, y2+100) is determined as the second location area.

It can be understood, in the relevant arts, the surveillance device directly detects an object in the visible light image generated from the visible light signal using an object detection method, obtains the location area of the object in the visible light image that is directly generated, and thereby implements intelligent surveillance. However, in the case of low illumination, the generated visible light image may have a poor image quality. Even by means of image enhancement or increasing local exposure, the image quality of the visible light image that directly generated cannot be greatly increased. Therefore, the relevant arts may not determine the accurate area where the object is located in the visible light image that is directly generated, and may not even make an accurate detection as to whether an object is present in that visible light image.

As can be seen from the above, compared to the relevant art, the solution provided in the embodiments of the present application proposes to use the result of the object detection performed on the non-visible light image to determine the result of the object detection on the visible light image corresponding to the non-visible light image. In the case of low illumination, as the non-visible light image has a high image quality, a detection result with high accuracy can be obtained from the object detection on the non-visible light image, which guarantees a result of the object detection on the visible light image with high accuracy and thereby guarantees the effect of intelligent surveillance.

In addition, the surveillance device may further include a fill light lamp for providing non-visible light. The light produced by the fill light lamp for providing non-visible light guarantees sufficient non-visible light. This allows the obtained non-visible light image to have a higher signal-to-noise ratio, and guarantees the accuracy of the result of the object detection performed on the non-visible light image.

Figure 4:
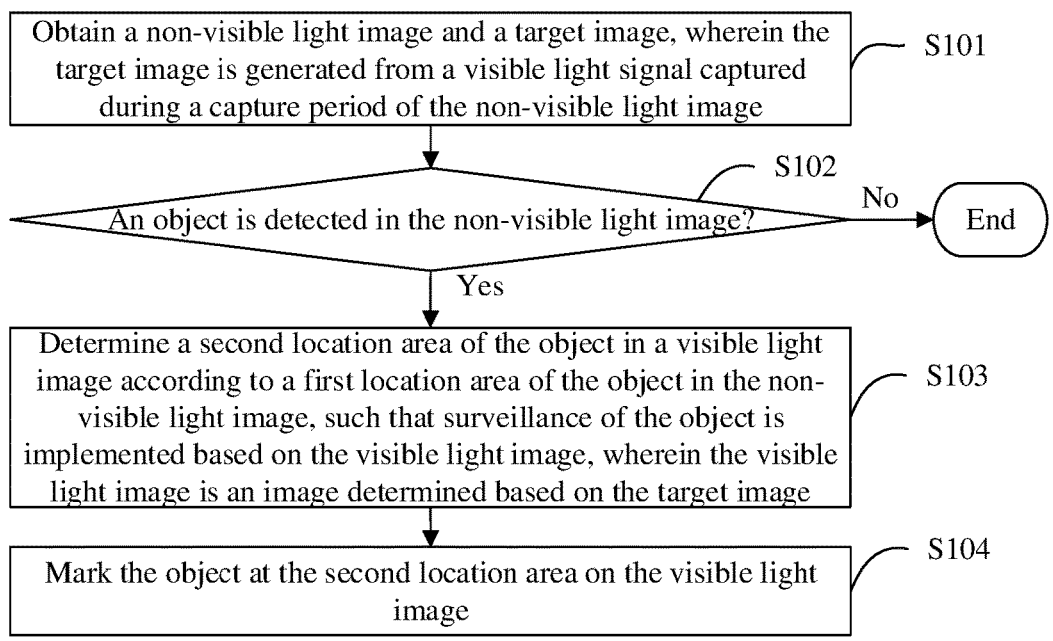
FIG. 4 is a schematic flowchart of a surveillance method provided by another embodiment of the present application.

It can be understood that, in the foregoing embodiments, after the implementation of the surveillance method, the surveillance device obtains the visible light image with the second location area has been determined. In a case, the surveillance device may store this visible light image (a visible light image having object detection results) locally or send it to other device for viewing. In order to clearly show the location where the object is in the image during the display of the visible light image with the second location area determined, as shown in FIG. 4, after the step of determining the second location area of the object in the visible light image according to the first location area of the object in the non-visible light image (S103), the method may further include step S104, marking the object at the second location area on the visible light image.

The step S104 can be implemented in various ways, as long as the second location area can be seen by people when the visible light image with the second location area therein marked is displayed, which will not be limited herein. For example, when the visible light image with the second location area marked is displayed, the edge of the second location area in the visible light image may be highlighted, or the second location area may be marked with a red frame in the visible light image. Of course, the step S104 may be performed using any marking approach in the related art, which will not be described in detail herein.

In an optional implementation, the preset object may include objects of at least two classes. For example, the object contains a human and a vehicle. In order for people to clearly see the class of each object which has been detected in the visible light image during its display, after the step of marking the object at the second location area on the visible light image (S104), the surveillance method may further include marking the class of each object in the visible light image with respect to the determined second location area where each object is located.

It can be understood that the classes of the objects to be detected can be set in advance. During the detection of the first location area where the object is located in the non-visible light image, the surveillance device detects the objects in connection with their respective classes, and thus the surveillance device can identify the class of each object. For example, the surveillance device detects the first location area where a tree is located in the non-visible light image. Obviously, upon the detection of one first location area, the object located in that first location area is of the class of trees.

It should also be noted that the class of an object in each second location area in the visible light image is the same as the class of the object in the first location area corresponding to the second location area. For example, an object in the first location area in the non-visible light image is of the class of cars, and thus the object in the second location area in the visible light image corresponding to the first location area is also of the class of vehicles.

Here, the step marking the class of the object on the visible light image with respect to the determined second location area of the object can be implemented by marking the class of each object in the determined second location area where the object is located. For example, the determined second location area is framed in red on the displayed visible light image, and a text of "human" as the class is displayed within the framed area. Alternatively, said step may be implemented by marking the class of each object within a preset pixel distance outside the determined second location area where the object is located. For example, the determined second location area is framed in red on the displayed visible light image, and a text of "human" as the class is displayed at a distance of 20 pixels from the lower right corner of the red frame.

Of course, the classes of detected objects may be marked by using techniques in the related art, as long as the class corresponding to each second location area can be clearly shown when the visible light image is displayed, which will not be described in detail herein.

Further, in an optional implementation of the embodiment of the present application, when an object is detected in the non-visible light image, the method may further include identifying attribute information of the object in the non-visible light image to obtain an identification result.

The attribute information can be understood as preset attribute information that is preset to be identified. For example, if the object is a vehicle, the attribute information may be the license plate number of the vehicle, the type of the vehicle, and the like. If the object is a human, the attribute information may be the gender of the human and the like. Of course, the attribute information can be set depending on actual needs, which will not be limited herein.

In addition, the attribute information of the object in the non-visible light image may be identified using any image identification techniques in the relevant art, which may include but not limited to training and classification based image identification approaches, neural network based image identification approaches, and wavelet moment based image identification approaches, and the like.

Accordingly, after the step of marking the object at the second location area on the visible light image (S104), the method may further include marking the identification result for the object in the visible light image with respect to the second location area.

Here, the identification result for the object in the visible light image may be marked with respect to the second location area by marking the class and/or the identification result of the object in the determined second location area where the object is located. For example, the object is of the class of vehicles, and the attribute information is the type and the license plate number of the vehicle. Then, the second location area is framed in red on the displayed visible light image, and the type and license plate number of the vehicle, such as "truck, Jing Axxxxx" are displayed in the red frame area.

Alternatively, the identification result for the object in the visible light image may be marked with respect to the second location area by marking the class and/or the identification result of the object within a preset pixel distance outside the second location area where the object is located. For example, the object is of the class of humans and the attribute information is the gender of the human; then the determined second location area is framed in red on the displayed visible light image, and the identification result "male" is displayed at a distance of 20 pixels from the lower right corner of the red frame.

Of course, the identification result may be marked by using techniques in the related art, as long as the identification result corresponding to each second location area can be clearly shown when the visible light image is displayed, which will not be described in detail herein.

It can also be understood that in the case of low illumination, since the non-visible light image has high image quality, the image identification performed on the non-visible light image can produce an identification result with high accuracy. The embodiments of the present application marks the identification result for the object in the visible light image, such that the visible light image can also carry accurate image identification result.

In addition, the visible light image in the embodiment of the present application may be marked with the second location area and the class of the object, or may be marked with the second location area and the identification result for the object, or may also be marked with the second location area, the class of the object, and the identification result for the object.

In the embodiment of the present application, the surveillance device may have a display component. In this case, the marked visible light image can be locally displayed on the surveillance device, such that the marked part in the displayed visible light image can be clearly seen by viewers. Obviously, the marked visible light image described herein is a visible light image marked with the second location area, and also marked with the class of the object and/or the identification result for the object.

Of course, in most cases, after the marked visible light image is obtained, the surveillance device may transmit the marked visible light image to other storage device. A display device can access the visible light image from the storage device and display it. In this case, to facilitate transmission, the surveillance device may perform a video encoding operation on the marked visible light image, and then transmit the encoded visible light image to the storage device.

The embodiment of the present application is described below briefly by way of an example.

In the example, the surveillance device is a dome camera connected to a back-end console. The dome camera includes a camera lens, a beam-splitting unit, a visible light sensor, and a non-visible light sensor. The classes of an object to be detected are preset to humans and vehicles. First, incident light is captured by the camera lens, and is divided into a visible light signal and a non-visible light signal by the beam-splitting unit. The visible light sensor uses the visible light signal to generate an original visible light image. Similarly, the non-visible light sensor uses a non-visible light signal captured during the same exposure period to generate an original non-visible light image.

Figure 5:
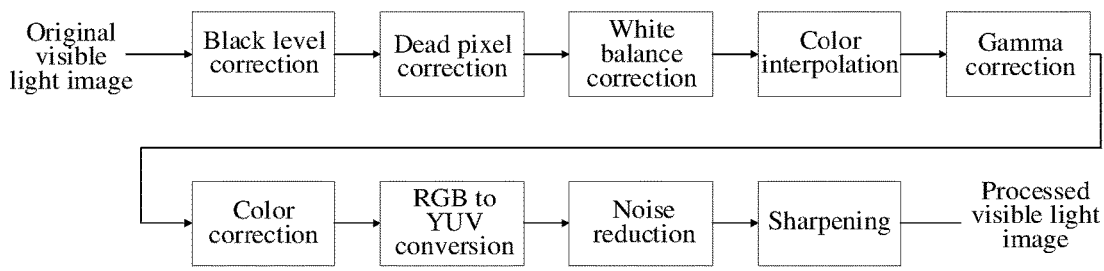
FIG. 5 is a schematic diagram showing the process of an ISP performed on a target image involved in an embodiment of the present application.
Figure 6:
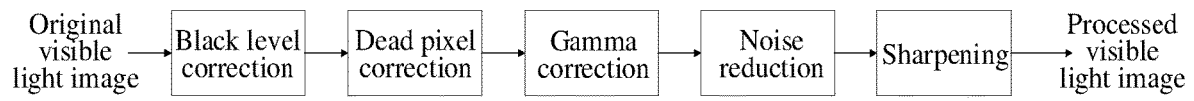
FIG. 6 is a schematic diagram showing the process of an ISP performed on a non-visible light image involved in an embodiment of the present application.

Next, the dome camera performs an ISP on the original visible light image to obtain a processed visible light image. As shown in FIG. 5, the ISP performed on the original visible light image includes: black level correction, dead pixel correction, white balance correction, color interpolation, Gamma correction, color correction, and RGB to YUV conversion, noise reduction, and sharpening processing in turn. Similarly, the dome camera also performs an ISP on the original non-visible light image to obtain a processed non-visible light image. As shown in FIG. 6, the ISP performed on the non-visible light image includes black level correction, dead pixel correction, Gamma correction, noise reduction and sharpening processing in turn.

Figure 7:
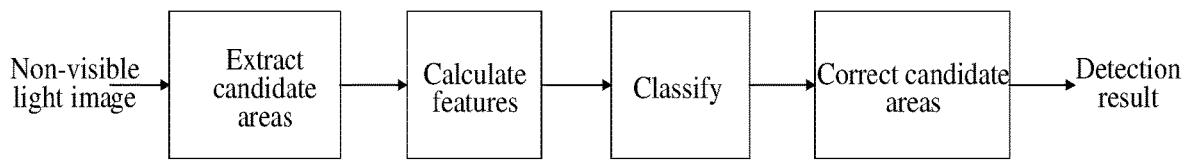
FIG. 7 is a schematic diagram showing the process of object detection performed on a non-visible light image involved in an embodiment of the present application.

As shown in FIG. 7, the dome camera then performs object detection on the processed non-visible light image with a deep learning-based object detection approaches, including the following steps: 1. extracting candidate areas, 2. calculating features, 3. classifying, and 4. performing fine tuning on the candidate areas. The dome camera determines that an object to be detected, i.e., a vehicle, is present in the processed non-visible light image, and the first location area of the vehicle in the processed non-visible light image is a rectangular area with pixels coordinates from (x3, y3) to (x3+50, y2+80). Then, the dome camera identifies the license plate number of the vehicle in the non-visible light image by a training and classification based image identification approach, and obtains an identification result, which is "Zhe Axxxxx".

The dome camera then uses the processed visible light image as a reference to perform location registration on the first location area of the object vehicle in the processed non-visible light image, and obtains a first location area that has been subjected to the registration. The first location area that has been subjected to the registration is a rectangular area with pixels of coordinates from (x3+2, y3+4) to (x3+52, y3+84) in the non-visible light image. In the processed visible light image, a rectangular area with pixels of coordinates from (x3+2, y3+4) to (x3+52, y3+84) is determined as the second location area in the visible light image.

The dome camera marks the second location area on the processed visible light image, and marks the class of the vehicle and the identification result in the second location area. The dome camera then encodes the marked visible light image and sends it to the back-end console. The back-end console receives and displays the marked visible light image. In the displayed visible light image, the second location area is framed with red lines, and the class of the object, i.e., "vehicle", and the above identification result, i.e., "Zhe Axxxxx", are displayed in the red frame.

Figure 8:
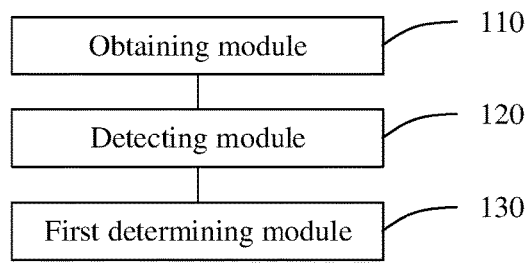
FIG. 8 is a schematic structural diagram of a surveillance apparatus provided by an embodiment of the present application.

Corresponding to the method embodiment shown in FIG. 1, an embodiment of the present application further provides a surveillance apparatus. As shown in FIG. 8, the apparatus includes: an obtaining module 110 configured to obtain a non-visible light image and a target image, wherein the target image is generated from a visible light signal captured during a capture period of the non-visible light image; a detecting module 120 configured to detect an object in the non-visible light image; a first determining module 130 configured to determine, when an object is detected in the non-visible light image by the detecting module 120, a second location area of the object in a visible light image according to a first location area of the object in the non-visible light image, such that surveillance of the object is implemented based on the visible light image, wherein the visible light image is an image determined based on the target image.

In an optional implementation of the embodiment of the present application, the visible light image may be the target image. In this case, the first determining module 130 may be specifically configured to perform location registration on the first location area of the object in the non-visible light image taking the visible light image as a reference to obtain a first location area that has subjected to the registration, and determine a location area in the visible light image corresponding to the first location area that has subjected to the registration as the second location area of the object in the visible light image.

In an optional implementation of the embodiment of the present application, the first determining module 130 is specifically configured to perform the location registration on the first location area of the object in the non-visible light image according to the following formula taking the visible light image as the reference to obtain the first location area that has subjected to the registration, and determine a location area in the visible light image corresponding to the first location area that has subjected to the registration as the second location area of the object in the visible light image:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

In another optional implementation of the embodiment of the present application, the visible light image may be an image resulting from location registration applied to the target image taking the non-visible light image as a reference. In this case, the first determining module 130 is specifically configured to determine a location area in the visible light image, which is the same as the first location area of the object in the non-visible light image, as the second location area of the object in the visible light image.

Figure 9:
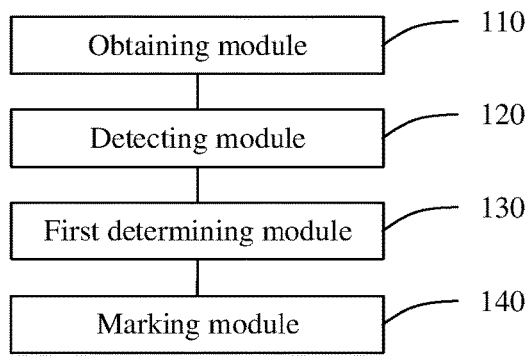
FIG. 9 is a schematic structural diagram of a surveillance apparatus provided by another embodiment of the present application.

Corresponding to the method embodiment shown in FIG. 4, as shown in FIG. 9, the apparatus may further include a marking module 140, configured to mark the object at the second location area on the visible light image after the second location area of the object in the visible light image is determined.

In an optional implementation of the embodiment of the present application, the marking module 140 may be further configured to mark a class of the object on the visible light image with respect to the determined second location area of the object after marking the object at the second location area on the visible light image.

In an optional implementation of the embodiment of the present application, the apparatus may further include an identifying module configured to identify, when an object is detected in the non-visible light image, attribute information of the object in the non-visible light image to obtain an identification result. Accordingly, the marking module is further configured to mark the identification result for the object on the visible light image with respect to the second location area after marking the object at the second location area on the visible light image.

In an optional implementation of the embodiment of the present application, the apparatus may further include a second determining module configured to determine a fill light status parameter based on the non-visible light image after the non-visible light image and the target image are obtained; and a light filling module configured to provide non-visible light depending on the fill light status parameter.

As can be seen from the above, compared with the relevant art, the solution provided in the embodiment of the present application proposes to use the result of the object detection performed on the non-visible light image to determine the result of the object detection performed for the visible light image corresponding to the non-visible light image. In the case of low illumination, as the non-visible light image has a high image quality, a detection result with high accuracy can be obtained from the object detection on the non-visible light image, which guarantees that the object detection result of the visible light image also has a high accuracy and thereby guarantees the effect of intelligent surveillance.

In addition, the surveillance device may further include a fill light lamp for providing non-visible light. The light generated by the fill light lamp for providing non-visible light guarantees sufficient non-visible light. This allows the obtained non-visible light image to have a higher signal-to-noise ratio, and guarantees the accuracy of the result of the object detection performed on the non-visible light image.

Figure 10:
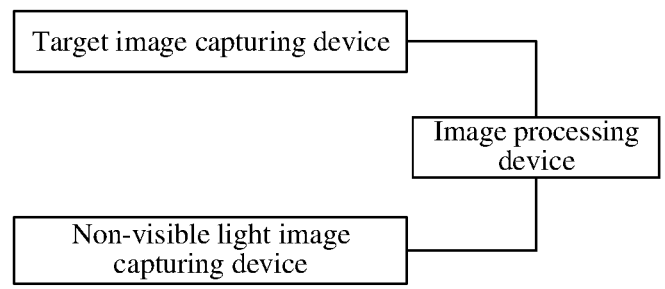
FIG. 10 is a schematic structural diagram of a surveillance system provided by an embodiment of the present application.

Corresponding to the method embodiment shown in FIG. 1, an embodiment of the present application further provides a surveillance system. As shown in FIG. 10, the system includes a target image capturing device, a non-visible light image capturing device, and an image processing device. The non-visible light image capturing device is configured to capture a non-visible light image and transmit the captured non-visible light image to the image processing device. The target image capturing device configured to generate a target image from a visible light signal captured during a capture period of the non-visible light image, and transmit the target image to the image processing device. The image processing device is configured to receive the target image from the target image capturing device and the non-visible light image from the non-visible light image capturing device; perform object detection on the obtained non-visible light image with respect to the object to obtain a detection result containing a first location area of the object in the non-visible light image; and determine a second location area of the object in the visible light image according to the first location area, wherein the visible light image is an image determined based on the target image.

It is noted, in the embodiments of the present application, the target image capturing device and the non-visible light image capturing device may be two individual physical devices. Of course, the target image capturing device and the non-visible light image capturing device may also be arranged on a same physical entity. For example, the target image capturing device and the non-visible light image capturing device may be two sub-devices configured in a common dome camera.

Certainly, in the surveillance system provided by the embodiment of the present application, operations performed by each of the devices respectively may refer to corresponding operations performed by the surveillance device in the foregoing method embodiments, which will not be repeated herein.

In an optional implementation of the embodiment of the present application, the visible light image may be the target image. In this case, the image processing device may determine the second location area of the object in the visible light image according to the first location area of the object in the non-visible light image by: performing location registration on the first location area of the object in the non-visible light image taking the visible light image as a reference to obtain a first location area that has subjected to the registration, and determining a location area in the visible light image corresponding to the first location area that has subjected to the registration as the second location area of the object in the visible light image.

In an optional implementation of the embodiment of the present application, the image processing device may perform the location registration on the first location area of the object in the non-visible light image taking the visible light image as the reference to obtain the first location area that has subjected to the registration by: performing the location registration on the first location area of the object in the non-visible light image according to the following formula taking the visible light image as the reference to obtain the first location area that has subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

In another optional implementation of the embodiment of the present application, the visible light image may be an image resulting from location registration applied to the target image taking the non-visible light image as a reference. In this case, the image processing device may determine the second location area of the object in the visible light image according to the first location area of the object in the non-visible light image by: determining a location area in the visible light image, which is the same as the first location area of the object in the non-visible light image, as the second location area of the object in the visible light image.

Corresponding to the method embodiment shown in FIG. 4, in an optional implementation of the embodiment of the present application, the image processing device may be further configured to mark the object at the second location area on the visible light image.

In an optional implementation of the embodiment of the present application, the image processing device may be further configured to mark a class of the object on the visible light image with respect to the determined second location area of the object.

In an optional implementation of the embodiment of the present application, the image processing device may be further configured to: when an object is detected in the non-visible light image, identify attribute information of the object in the non-visible light image to obtain an identification result; and mark the identification result for the object on the visible light image with respect to the second location area after marking the object at the second location area on the visible light image.

Figure 11:
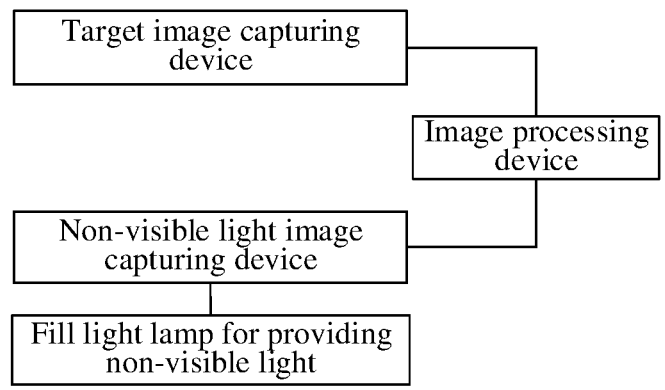
FIG. 11 is a schematic structural diagram of a surveillance system provided by another embodiment of the present application.

In an optional implementation of the embodiment of the present application, as shown in FIG. 11, the system may further include a fill light lamp for providing non-visible light. The non-visible light image capturing device is further configured to determine a fill light status parameter based on the non-visible light image after the non-visible light image and the target image are obtained; and transmit the fill light status parameter to the fill light lamp. The fill light lamp for providing non-visible light is configured to receive the fill light status parameter from the non-visible light image capturing device; and provide non-visible light depending on the fill light status parameter.

As can be seen from the above, compared with the relevant art, the solution provided in the embodiment of the present application proposes to use the result of the object detection performed on the non-visible light image to determine the result of the object detection performed for the visible light image corresponding to the non-visible light image. In the case of low illumination, as the non-visible light image has a high image quality, a detection result with high accuracy can be obtained from the object detection on the non-visible light image, which guarantees that the object detection result of the visible light image also has a high accuracy and thereby guarantees the effect of intelligent surveillance.

In addition, the surveillance device may further include a fill light lamp for providing non-visible light. The light generated by the fill light lamp for providing non-visible light guarantees sufficient non-visible light. This allows the obtained non-visible light image to have a higher signal-to-noise ratio, and guarantees the accuracy of the result of the object detection performed on the non-visible light image.

Figure 12:
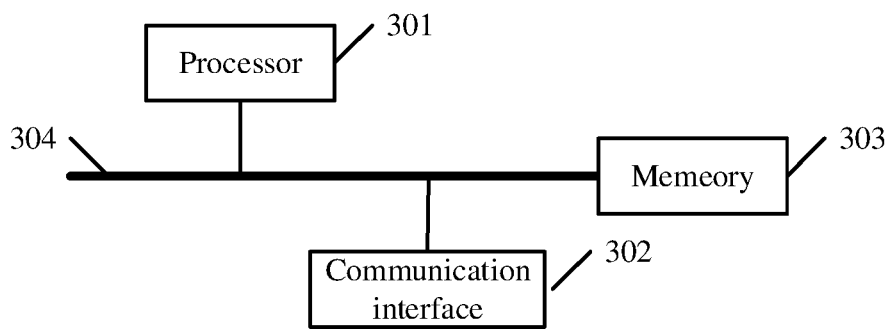
FIG. 12 is a schematic structural diagram of an electronic device provided by an embodiment of the present application.

An embodiment of the present application further provides an electronic device. As shown in FIG. 12, the electronic device includes a processor 301, a communication interface 302, a memory 303, and a communication bus 304. The processor 301, the communication interface 302, and the memory 303 communicate with each other via the communication bus 304. The memory 303 is configured to store a computer program. The processor 301 is configured to execute the program stored in the memory 303 to carry out operations including: obtaining a non-visible light image and a target image, wherein the target image is generated from a visible light signal captured during a capture period of the non-visible light image; detecting an object in the non-visible light image; and when an object is detected in the non-visible light image, determining a second location area of the object in a visible light image according to a first location area of the object in the non-visible light image, such that surveillance of the object is implemented based on the visible light image, wherein the visible light image is an image determined based on the target image.

In an optional implementation of the embodiment of the present application, the visible light image is the target image. The step of determining the second location area of the object in the visible light image according to the first location area of the object in the non-visible light image includes: performing location registration on the first location area of the object in the non-visible light image taking the visible light image as a reference to obtain a first location area that has subjected to the registration, and determining a location area in the visible light image corresponding to the first location area that has subjected to the registration as the second location area of the object in the visible light image.

In an optional implementation of the embodiment of the present application, the step of performing the location registration on the first location area of the object in the non-visible light image taking the visible light image as the reference to obtain the first location area that has subjected to the registration includes: performing the location registration on the first location area of the object in the non-visible light image according to the following formula taking the visible light image as the reference to obtain the first location area that has subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

In an optional implementation of the embodiment of the present application, the visible light image is an image resulting from location registration applied to the target image taking the non-visible light image as a reference. The of determining the second location area of the object in the visible light image according to the first location area of the object in the non-visible light image includes: determining a location area in the visible light image, which is the same as the first location area of the object in the non-visible light image, as the second location area of the object in the visible light image.

In an optional implementation of the embodiment of the present application, the processor 301 is further configured to perform the operation of: marking the object at the second location area on the visible light image, after determining the second location area of the object in the visible light image according to the first location area of the object in the non-visible light image.

In an optional implementation of the embodiment of the present application, the processor 301 is further configured to perform the operation of: marking a class of the object on the visible light image with respect to the determined second location area, after marking the object at the second location area on the visible light image.

In an optional implementation of the embodiment of the present application, the processor 301 is further configured to perform the operation of: when an object is detected in the non-visible light image, identifying attribute information of the object in the non-visible light image to obtain an identification result. Accordingly, the processor 301 is further configured to perform the operation of: marking the identification result for the object on the visible light image with respect to the second location area, after marking the object at the second location area on the visible light image.

In an optional implementation of the embodiment of the present application, the processor 301 is further configured to perform the operations of: determining a fill light status parameter based on the non-visible light image, after the non-visible light image and the target image are obtained; and providing non-visible light depending on the fill light status parameter.

For details of each of the operations performed by the processor, reference may be made to the method embodiments shown in FIG. 1 and FIG. 4 above, which will not be described herein.

The communication bus mentioned above may be a Peripheral Component Interconnect (PCI) bus or an Extended Industry Standard Architecture (EISA) bus. The communication bus may include an address bus, a data bus, a control bus, and the like. For illustration purpose, only a thick line is shown in the figures to represent the communication bus, but this does not mean that there is only one bus or one type of bus.

The communication interface is used for communication between the aforementioned electronic device and other devices.

The memory may include Random Access Memory (RAM), and may also include Non-Volatile Memory (NVM), such as at least one disk memory. Optionally, the memory may also be at least one storage located away from the processor.

The processor may be a general-purpose processor, including a central Processing Unit (CPU), a Network Processor (NP), and the like. It may also be a Digital Signal Processor (DSP), an Application Specific Integrated Circuit (ASIC), a Field-Programmable Gate Array (FPGA) or other programmable logic devices, discrete gate or transistor logic devices, discrete hardware components.

As can be seen from the above, compared with the relevant art, the solution provided in the embodiment of the present application proposes to use the result of the object detection performed on the non-visible light image to determine the result of the object detection performed for the visible light image corresponding to the non-visible light image. In the case of low illumination, as the non-visible light image has a high image quality, a detection result with high accuracy can be obtained from the object detection on the non-visible light image, which guarantees that the object detection result of the visible light image also has a high accuracy and thereby guarantees the effect of intelligent surveillance.

In yet another embodiment of the present application, a computer-readable storage medium is provided. The computer-readable storage medium stores instructions that, when executed on a computer, causes the computer to carry out operations including: obtaining a non-visible light image and a target image, wherein the target image is generated from a visible light signal captured during a capture period of the non-visible light image; detecting an object in the non-visible light image; and when an object is detected in the non-visible light image, determining a second location area of the object in a visible light image according to a first location area of the object in the non-visible light image, such that surveillance of the object is implemented based on the visible light image, wherein the visible light image is an image determined based on the target image.

In an optional implementation of the embodiment of the present application, the visible light image is the target image. The step of determining the second location area of the object in the visible light image according to the first location area of the object in the non-visible light image includes: performing location registration on the first location area of the object in the non-visible light image taking the visible light image as a reference to obtain a first location area that has subjected to the registration, and determining a location area in the visible light image corresponding to the first location area that has subjected to the registration as the second location area of the object in the visible light image.

In an optional implementation of the embodiment of the present application, the step of performing the location registration on the first location area of the object in the non-visible light image taking the visible light image as the reference to obtain the first location area that has subjected to the registration includes: performing the location registration on the first location area of the object in the non-visible light image according to the following formula taking the visible light image as the reference to obtain the first location area that has subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

In an optional implementation of the embodiment of the present application, the visible light image is an image resulting from location registration applied to the target image taking the non-visible light image as a reference. The step of determining the second location area of the object in the visible light image according to the first location area of the object in the non-visible light image includes: determining a location area in the visible light image, which is the same as the first location area of the object in the non-visible light image, as the second location area of the object in the visible light image.

In an optional implementation of the embodiment of the present application, the computer is further caused by the instructions to performs the operation of: marking the object at the second location area on the visible light image, after determining the second location area of the object in the visible light image according to the first location area of the object in the non-visible light image.

In an optional implementation of the embodiment of the present application, the computer is further caused by the instructions to carry the operation of: marking a class of the object on the visible light image with respect to the determined second location area, after marking the object at the second location area on the visible light image.

In an optional implementation of the embodiment of the present application, the computer is further caused by the instructions to carry the operation of: when an object is detected in the non-visible light image, identifying attribute information of the object in the non-visible light image to obtain an identification result. Accordingly, the computer is further caused by the instructions to carry out the operation of: marking the identification result for the object on the visible light image with respect to the second location area, after marking the object at the second location area on the visible light image.

In an optional implementation of the embodiment of the present application, the computer is further caused to carry out operations of: determining a fill light status parameter based on the non-visible light image, after the non-visible light image and the target image are obtained; providing non-visible light depending on the fill light status parameter.

As can be seen from the above, compared with the relevant art, the solution provided in the embodiment of the present application proposes to use the result of the object detection performed on the non-visible light image to determine the result of the object detection performed for the visible light image corresponding to the non-visible light image. In the case of low illumination, as the non-visible light image has a high image quality, a detection result with high accuracy can be obtained from the object detection on the non-visible light image, which guarantees that the object detection result of the visible light image also has a high accuracy and thereby guarantees the effect of intelligent surveillance.

In still another embodiment of the present application, a computer program product is provided which, when executed on a computer, causes the computer to carry out the surveillance method of any one of the above embodiments.

As can be seen from the above, compared with the relevant art, the solution provided in the embodiment of the present application proposes to use the result of the object detection performed on the non-visible light image to determine the result of the object detection performed for the visible light image corresponding to the non-visible light image. In the case of low illumination, as the non-visible light image has a high image quality, a detection result with high accuracy can be obtained from the object detection on the non-visible light image, which guarantees that the object detection result of the visible light image also has a high accuracy and thereby guarantees the effect of intelligent surveillance.

It should be noted that the relationship terms used herein, such as "first", "second" and the like, are only used to distinguish one entity or operation from another entity or operation, and do not necessarily require or imply that there is any such actual relationship or order between those entities or operations. Moreover, the terms "include," "comprise" or any variants thereof are intended to cover a non-exclusive inclusion, such that processes, methods, articles or devices including a series of elements include not only those elements, but also other elements not specified or the elements inherent to those processes, methods, articles, or devices. Without further limitations, an element limited by wording "comprise(s) a/an . . . " do not exclude that there are other identical elements in the processes, methods, articles, or devices that include that element.

All of the embodiments in the description are described in a correlated manner, and description of a component in an embodiment may apply to another containing the same. The description for each embodiment focuses on the differences from other embodiments. In particular, a brief description is provided to embodiments of apparatuses, systems, electronic devices, and computer-readable storage medium in view of their resemblance with the method embodiments. Relevant details can be known with reference to the description of the method embodiments.

The embodiments described above are only preferable embodiments of the present disclosure, and are not intended to limit the scope of protection of the present disclosure. Any modification, equivalent, and improvement within the spirit and principle of the present disclosure are all within the scope of protection of the present disclosure.

The invention claimed is:

1. A surveillance method, comprising:
obtaining a non-visible light image and a target image, wherein the target image is generated from a visible light signal captured during a capture period of the non-visible light image;
detecting an object in the non-visible light image; and
when an object is detected in the non-visible light image, determining a second location area of the object in a visible light image according to a first location area of the object in the non-visible light image, such that surveillance of the object is implemented based on the visible light image, wherein the visible light image is an image determined based on the target image;
wherein after the step of obtaining the non-visible light image and the target image, the method further comprises: determining a fill light status parameter based on the non-visible light image; and providing non-visible light depending on the fill light status parameter.

2. The method according to claim 1, wherein the visible light image is the target image; and wherein
the step of determining the second location area of the object in the visible light image according to the first location area of the object in the non-visible light image comprises:
performing location registration on the first location area of the object in the non-visible light image taking the visible light image as a reference to obtain a first location area that has subjected to the registration, and determining a location area in the visible light image corresponding to the first location area that has subjected to the registration as the second location area of the object in the visible light image.

3. The method according to claim 2, wherein the step of performing the location registration on the first location area of the object in the non-visible light image taking the visible light image as the reference to obtain the first location area that has subjected to the registration comprises:
performing the location registration on the first location area of the object in the non-visible light image according to the following formula taking the visible light image as the reference to obtain the first location area that has subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

4. The method according to claim 1, wherein
the visible light image is an image resulting from location registration applied to the target image taking the non-visible light image as a reference; and wherein
the step of determining the second location area of the object in the visible light image according to the first location area of the object in the non-visible light image comprises:
determining a location area in the visible light image, which is the same as the first location area of the object in the non-visible light image, as the second location area of the object in the visible light image.

5. The method according to claim 1, wherein after the step of determining the second location area of the object in the visible light image according to the first location area of the object in the non-visible light image, the method further comprises:
marking the object at the second location area on the visible light image.

6. The method according to claim 5, wherein after the step of marking the object at the second location area on the visible light image, the method further comprises:
marking a class of the object on the visible light image with respect to the determined second location area of the object.

7. The method according to claim 5, wherein when an object is detected in the non-visible light image, the method further comprises:
identifying attribute information of the object in the non-visible light image to obtain an identification result; and wherein
after the step of marking the object at the second location area on the visible light image, the method further comprises:
marking the identification result for the object on the visible light image with respect to the second location area.

8. A surveillance system, comprising a target image capturing device, a non-visible light image capturing device, and an image processing device, wherein
the non-visible light image capturing device is configured to capture a non-visible light image and transmit the captured non-visible light image to the image processing device;
the target image capturing device is configured to generate a target image from a visible light signal captured during a capture period of the non-visible light image, and transmit the target image to the image processing device; and
the image processing device is configured to receive the target image from the target image capturing device and the non-visible light image from the non-visible light image capturing device; detect an object in the non-visible light image; and when an object is detected in the non-visible light image, determine a second location area of the object in a visible light image according to a first location area of the object in the non-visible light image, such that surveillance of the object is implemented based on the visible light image, wherein the visible light image is an image determined based on the target image;
wherein the system further comprises a fill light lamp for providing non-visible light, wherein the non-visible light image capturing device is further configured to determine a fill light status parameter based on the non-visible light image after the non-visible light image and the target image are obtained; and transmit the fill light status parameter to the fill light lamp; and the fill light lamp is configured to receive the fill light status parameter from the non-visible light image capturing device; and provide non-visible light depending on the fill light status parameter.

9. The system according to claim 8, wherein
the visible light image is the target image; and
the image processing device determines the second location area of the object in the visible light image according to the first location area of the object in the non-visible light image by:
performing location registration on the first location area of the object in the non-visible light image taking the visible light image as a reference to obtain a first location area that has subjected to the registration, and determining a location area in the visible light image corresponding to the first location area that has subjected to the registration as the second location area of the object in the visible light image.

10. The system according to claim 9, wherein the image processing device performs the location registration on the first location area of the object in the non-visible light image taking the visible light image as the reference to obtain the first location area that has subjected to the registration by:
performing the location registration on the first location area of the object in the non-visible light image according to the following formula taking the visible light image as the reference to obtain the first location area that has subjected to the registration:

$$\begin{bmatrix} x1 \\ y1 \\ 1 \end{bmatrix} = \begin{bmatrix} x'/z' \\ y'/z' \\ z'/z' \end{bmatrix};$$

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} * \begin{bmatrix} x \\ y \\ 1 \end{bmatrix};$$

wherein (x, y) represents coordinates of a pixel in the first location area, (x1, y1) represents coordinates of a corresponding pixel in the first location area that has subjected to the registration, and $$\begin{bmatrix} a_{11} & a_{12} & a_{13} \\ a_{21} & a_{22} & a_{23} \\ a_{31} & a_{32} & a_{33} \end{bmatrix}$$

is an affine transformation matrix obtained through offline calibration.

11. The system according to claim 8, wherein
the visible light image is an image resulting from location registration applied to the target image taking the non-visible light image as a reference; and wherein
the image processing device determines the second location area of the object in the visible light image according to the first location area of the object in the non-visible light image by:
determining a location area in the visible light image, which is the same as the first location area of the object in the non-visible light image, as the second location area of the object in the visible light image.

12. The system according to claim 8, wherein the image processing device is further configured to:
mark the object at the second location area on the visible light image.

13. The system according to claim 12, wherein the image processing device is further configured to:
mark a class of the object on the visible light image with respect to the determined second location area of the object.

14. The system according to claim 12, wherein the image processing device is further configured to:
when an object is detected in the non-visible light image, identify attribute information of the object in the non-visible light image to obtain an identification result; and
mark the identification result for the object on the visible light image with respect to the second location area after marking the object at the second location area on the visible light image.

15. An electronic device, comprising a processor, a communication interface, a memory, and a communication bus; wherein the processor, the communication interface, and the memory communicate with each other via the communication bus;
the memory is configured to store a computer program;
the processor is configured to execute the program stored in the memory to carry out the method of claim 1.

16. A non-transitory computer-readable storage medium having stored thereon a computer program which, when executed by a processor, cause the processor to carry out the steps of the method according to claim 1.

\* \* \* \* \*